United States Patent [19]

Readnour et al.

[11] Patent Number: 5,000,399
[45] Date of Patent: Mar. 19, 1991

[54] VARIABLE CONTOUR ANNULAR AIR INLET FOR AN AIRCRAFT ENGINE NACELLE

[75] Inventors: Jack L. Readnour, Ft. Mitchell, Ky.; Jack D. Wright, Mason, Ohio

[73] Assignee: General Electric Company, Cincinnati, Ohio

[21] Appl. No.: 483,693

[22] Filed: Feb. 23, 1990

[51] Int. Cl.$^5$ .................................................. B64C 33/02
[52] U.S. Cl. .................................. 244/53 B; 244/219; 244/130
[58] Field of Search ............... 244/204, 214, 218, 219, 244/130, 53 B; 137/15.1, 15.2

[56] References Cited

U.S. PATENT DOCUMENTS

| | | | |
|---|---|---|---|
| 2,323,542 | 7/1943 | Jacobs | 244/219 |
| 2,343,986 | 3/1944 | Leutholt | 244/214 |
| 2,423,803 | 7/1947 | Stalker | 244/42 |
| 3,074,232 | 1/1963 | Soyer | 244/219 |
| 3,222,863 | 12/1965 | Klees et al. | 60/35.6 |
| 3,425,650 | 2/1969 | Silva | 244/130 |
| 3,481,562 | 12/1969 | Deplante | 244/46 |
| 3,532,100 | 10/1970 | Ward et al. | 137/15.1 |
| 3,532,129 | 10/1970 | Ward et al. | 244/53 B |
| 3,664,612 | 5/1972 | Skidmore et al. | 244/53 B |
| 3,698,668 | 10/1972 | Cole | 244/44 |
| 3,716,209 | 2/1973 | Pierce | 244/123 |
| 3,763,874 | 10/1973 | Wilde et al. | 244/53 B |
| 3,765,623 | 10/1973 | Donelson et al. | 244/53 B |
| 3,806,065 | 4/1974 | Custer | 244/218 |
| 3,986,688 | 10/1976 | Giragosian | 244/42 DC |
| 4,351,502 | 9/1982 | Statkus | 244/219 |
| 4,500,052 | 2/1985 | Kim | 244/12.1 |
| 4,530,301 | 7/1985 | Latham | 114/102 |
| 4,549,464 | 10/1985 | Hawkins et al. | 89/1.809 |

Primary Examiner—Galen Barefoot
Attorney, Agent, or Firm—Jerome C. Squillaro

[57] ABSTRACT

An annular nacelle for a turbine engine of an aircraft has a variable contour annular air inlet. The variable contour annular inlet includes annular outer and inner surface-defining radially-spaced structures on the forward portion of the nacelle, an annular member disposed between the annular outer and inner structures and coupled to the annular outer structure for sliding movement along the interiors of the annular outer and inner structures, and a plurality of actuating mechanisms coupled between the nacelle body and the annular member. The actuating mechanisms are operable for moving the annular member between forward and rearward positions. At the forward position, the annular member is located between the forward ends of the annular outer and inner structures with the annular outer structure expanded to an enlarged diameter such that the annular member forms therewith an inlet lip having an aerodynamically blunt exterior contour adapted to reduce drag during takeoff and landing operation of the aircraft. At the rearward position, the annular member is spaced rearwardly from the forward ends of the annular outer and inner structures with the annular outer structure contracted to a reduced diameter permitting the annular outer and inner structures at the forward ends thereof to form an inlet lip having an aerodynamically sharp exterior contour adapted to reduce drag during cruise operation of the aircraft.

30 Claims, 5 Drawing Sheets

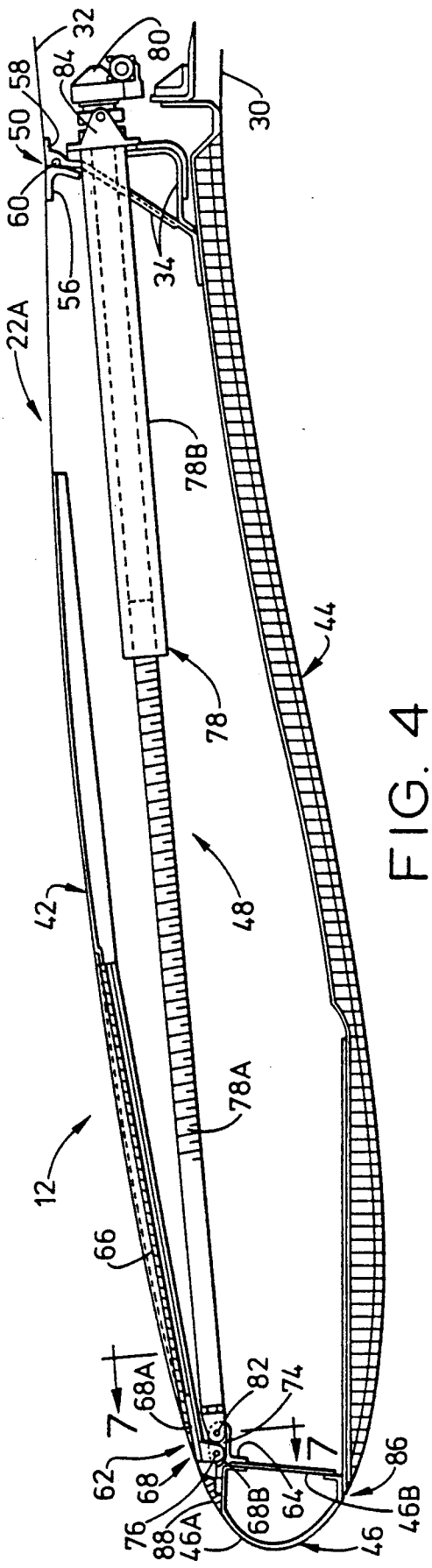
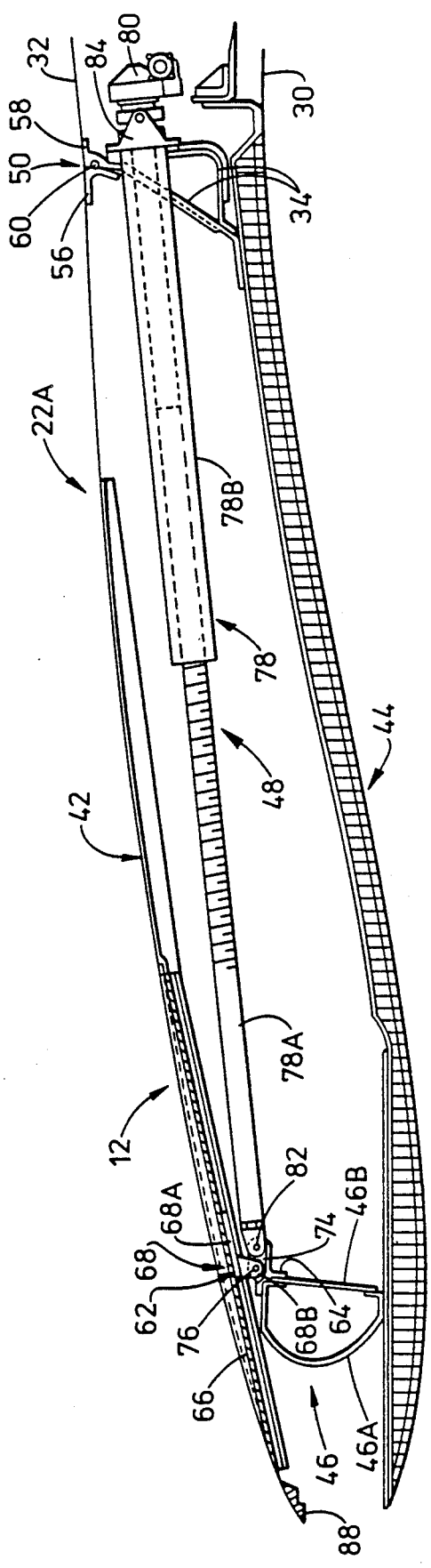
FIG. 4
FIG. 5

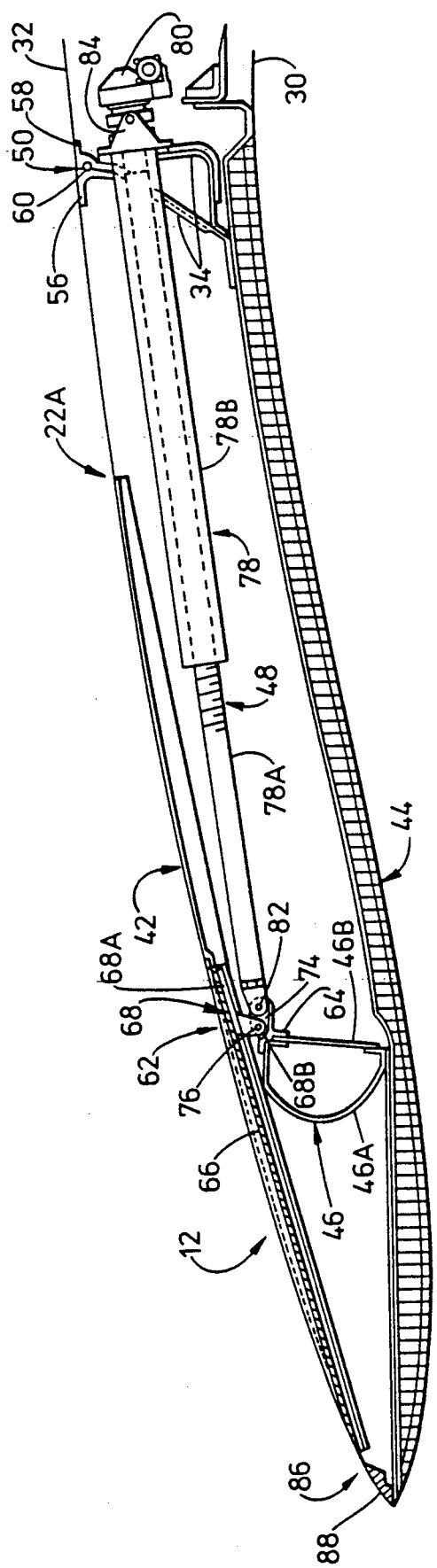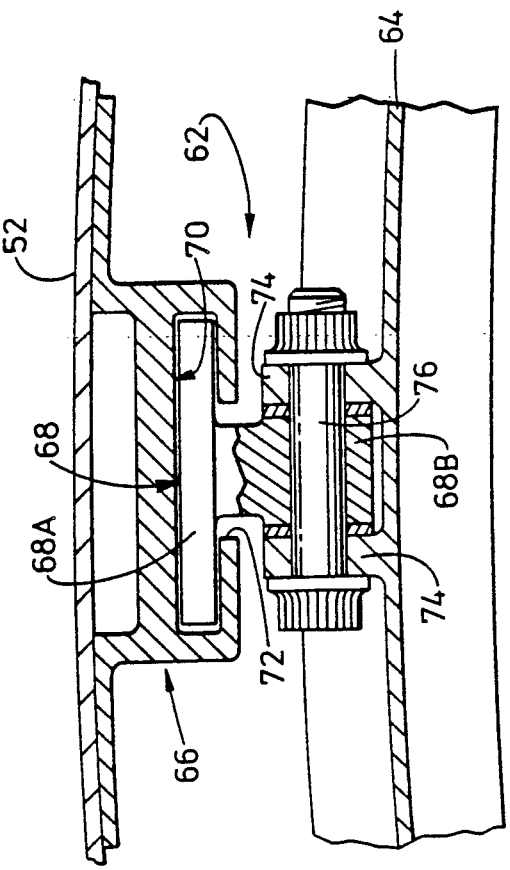

VARIABLE CONTOUR ANNULAR AIR INLET FOR AN AIRCRAFT ENGINE NACELLE

BACKGROUND OF THE INVENTION

1. Field of the Invention

The present invention relates generally to a gas turbine engine and, more particularly, to a variable contour annular air inlet for an aircraft engine nacelle.

2. Description of the Prior Art

An aircraft engine nacelle is typically a circumferentially extending housing for an aircraft engine, such as a gas turbine engine, which has an annular air inlet. Aerodynamic drag due to freestream airflow over the engine nacelle reduces somewhat the propulsion system thrust output. Any reduction in this aerodynamic drag can result in an increase in propulsion system thrust output during takeoff and low-speed operation and in a significant saving in the amount of fuel consumed during high-speed cruise operation. A desirable nacelle design, therefore, is one that provides a lightweight housing for the aircraft engine while producing relatively low aerodynamic drag.

The contour of the annular air inlet of the nacelle greatly affects aerodynamic drag and air flow characteristics. However, selection of the proper inlet contour is difficult in that different configurations are desirable for different operating conditions of the aircraft. For instance, during high-speed flight or cruise operation of the aircraft, an inlet having a thin sharp contour of reduced diameter is desirable to minimize aerodynamic drag. However, for takeoff or landing and low-speed operation of the aircraft, an inlet having a fat blunt contour of increased diameter is ideal to prevent flow separation and avoid aerodynamic drag increases which will reduce thrust during operation at high angles of attack.

One approach to nacelle air inlet contour selection is to design the inlet with a fixed configuration to serve the most critical operating condition of the aircraft, such being takeoff and landing. As a result, a performance penalty will be incurred at high-speed cruise operating conditions due to an excess amount of drag. This prior art approach is exemplified by U.S. Pat. No. 3,765,623 to Donelson et al.

Another approach to nacelle air inlet contour selection is to provide means for changing or varying the configuration of the inlet in accordance with the particular operating condition. This prior art approach is represented by U.S. Pat. No. 3,222,863 to Klees et al and U.S. Pat. No. 3,664,612 to Skidmore et al. The variable inlet contour approach offers more versatility and flexibility than the fixed inlet contour approach, but at the expense of more weight and mechanical complexity.

Still, the variable inlet contour approach appears to hold out more promise for achieving reduction of aerodynamic drag than the fixed inlet contour approach. Consequently, a need still remains for an improved way to provide a variable contour nacelle inlet while minimizing the above-described problems.

SUMMARY OF THE INVENTION

The present invention provides a variable contour annular air inlet designed to satisfy the aforementioned needs. The contour of the annular air inlet of the engine nacelle can be changed between aerodynamically blunt and sharp configurations for accommodating the different conditions of takeoff and cruise operation of the aircraft. In such manner, the contour of an engine nacelle air inlet can be changed in flight so as to allow optimum performance at both cruise conditions and takeoff and landing conditions.

Accordingly, the present invention provided in an annular nacelle for a turbine engine of an aircraft is directed to a variable contour annular air inlet. The variable contour annular inlet comprises: (a) a pair of annular outer and inner surface-defining structures extending axially forwardly from a body of the nacelle and being spaced radially from one another with respect to a central axis of the nacelle body, the annular outer structure having an annular forward end portion expandable and contractible in diameter and the annular inner structure having an annular forward end portion of a fixed diameter; (b) an annular member having a curved annular forward surface portion and a fixed diameter and being disposed between the annular outer and inner structures and coupled to the annular outer structure for sliding movement along the interiors of the annular outer and inner structures and the axis of the nacelle body; and (c) means coupled between the nacelle body and annular member and being operable for moving the annular member between forward and rearward positions. At the forward position, the annular member is located between forward ends of the annular outer and inner structures with the annular outer structure expanded to an enlarged diameter such that the annular member, together with the forward end portions of the outer and inner structures, form an inlet lip having an aerodynamically blunt exterior contour adapted to reduce drag during takeoff and landing operation of the aircraft. At the rearward position, the annular member is spaced rearwardly from the forward ends of the annular outer and inner structures with the annular outer structure contracted to a reduced diameter permitting the outer and inner structures at the forward end portions thereof to form an inlet lip having an aerodynamically sharp exterior contour adapted to reduce drag during cruise operation of the aircraft.

More particularly, the annular outer structure includes a plurality of trapezoidally-shaped, circumferentially side-by-side disposed longitudinal segments. The longitudinal segments are hinged mounted at their rear ends to the nacelle body for pivotal movement radially toward and away from the central axis of the nacelle body. Such pivotal movement of the segments produces contraction and expansion of the annular outer structure between the reduced and enlarged diameters at the forward end portions thereof. Also, the annular outer structure includes means for sealable covering any gaps existing between said longitudinal segments.

Further, the operable means includes a plurality of actuating mechanisms spaced circumferentially from one another about the central axis. Each actuating mechanism includes an extendable and retractable actuator coupled to and extending between the nacelle body and the annular member, and a power means drivingly coupled to the extendable and retractable actuator.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is an enlarged fragmentary view of the nacelle of the engine taken along line 4—4 in FIG. 1, illustrating the variable contour annular inlet with an aerodynamically blunt contour for low-speed takeoff and landing operation of an aircraft.

FIG. 5 is a view similar to that of FIG. 4, but illustrating the variable contour annular inlet in transition between the aerodynamically blunt and sharp configurations of FIGS. 4 and 6.

FIG. 6 is a view similar to that of FIG. 4, but illustrating the variable contour annular inlet with the aerodynamically sharp configuration for high-speed cruise operation of an aircraft.

FIG. 7 is an enlarged fragmentary cross-sectional view of the variable contour annular inlet as taken along line 7—7 in FIG. 4.

DETAILED DESCRIPTION OF THE INVENTION

Figure 2:
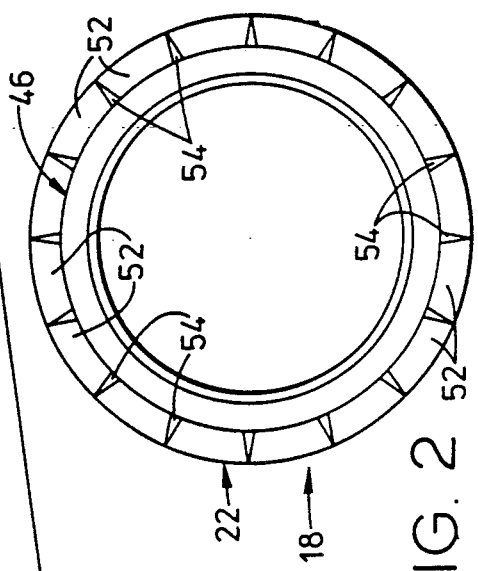
FIG. 2 is a diagrammatic front end view of the variable contour annular inlet of the engine nacelle of FIG. 1.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
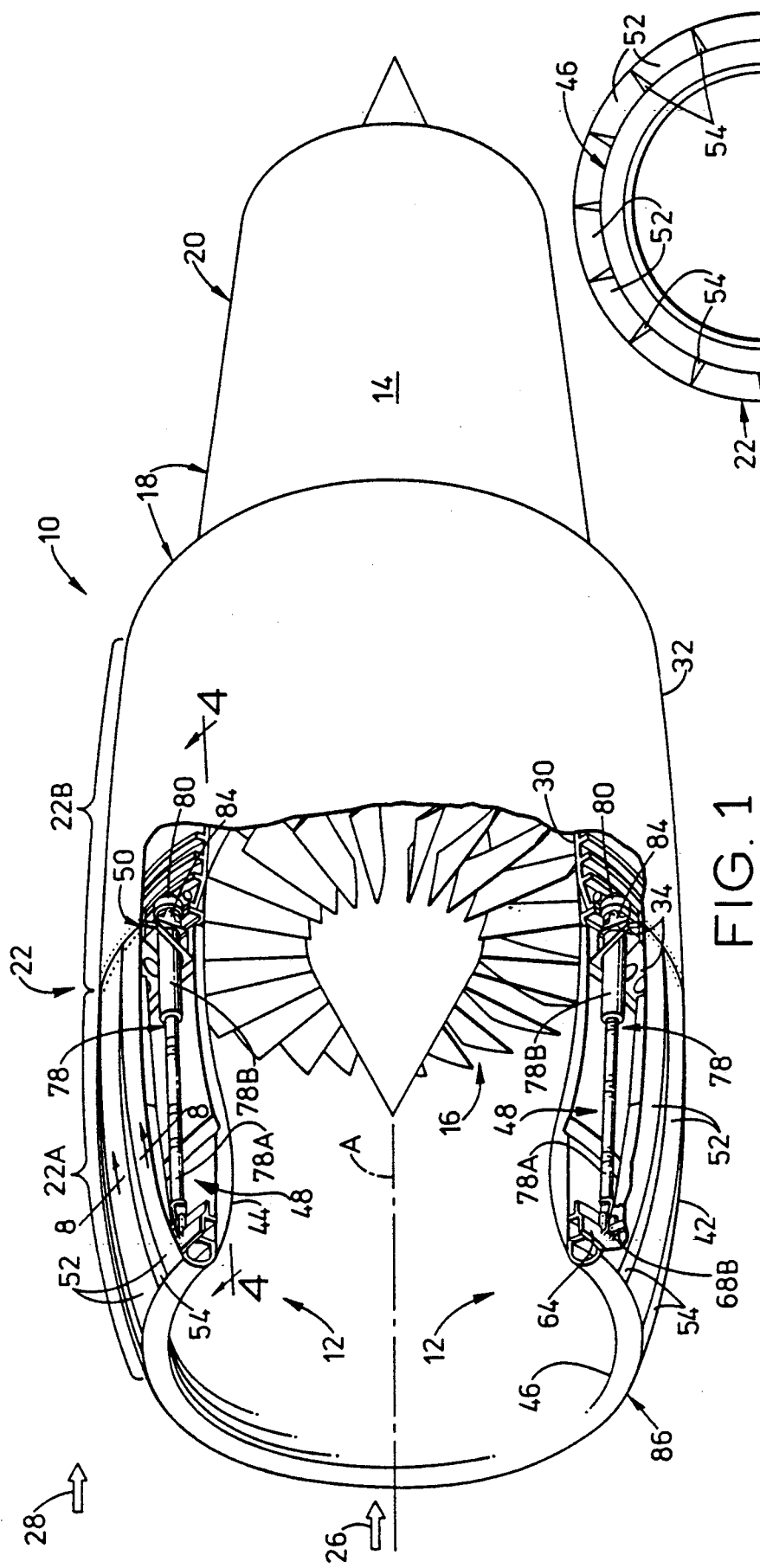
FIG. 1 is a cutaway perspective view of an aircraft gas turbine engine having a nacelle with a variable contour annular air inlet in accordance with the present invention.
Figure 3:
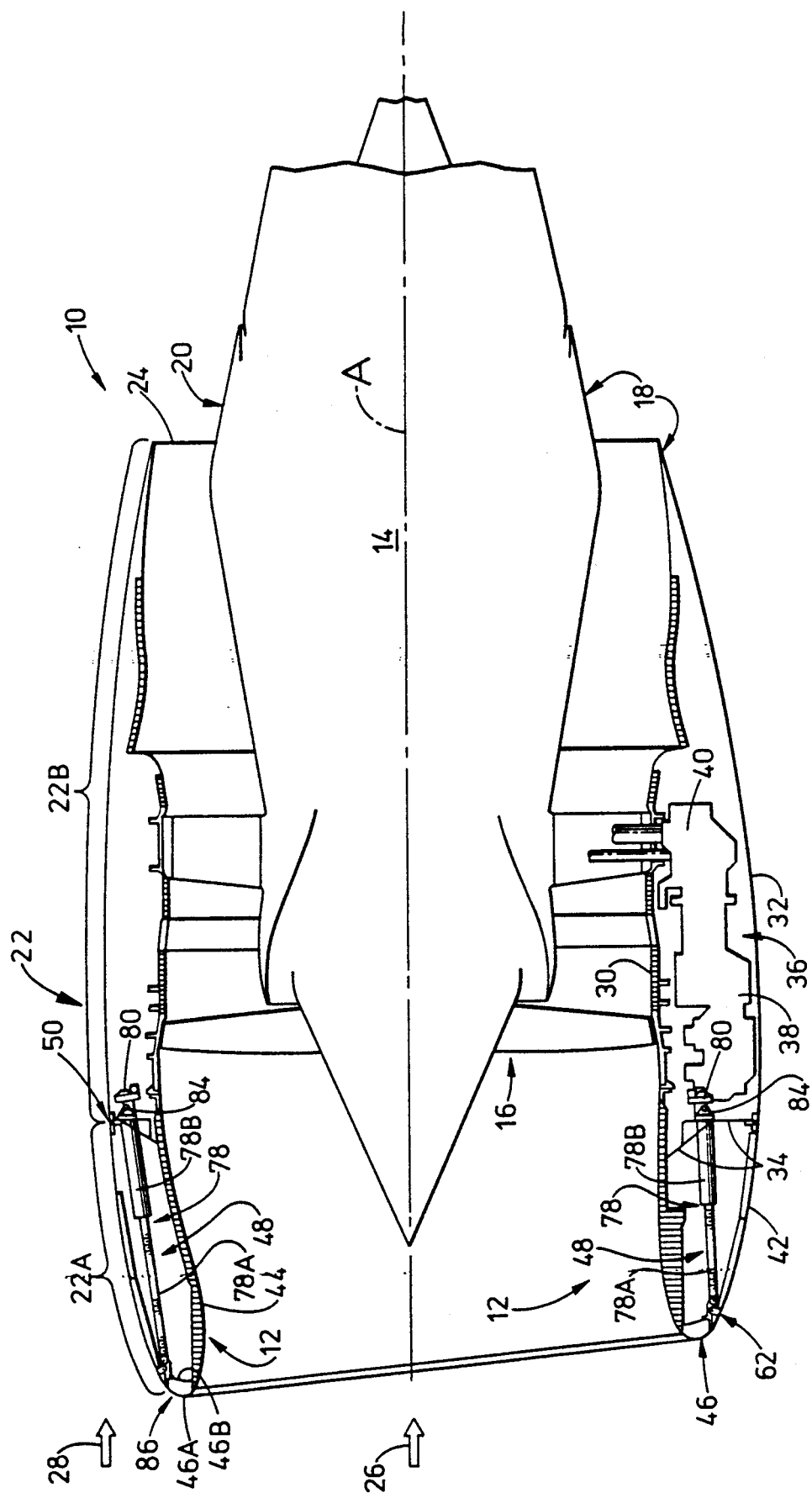
FIG. 3 is an enlarged side elevational view of the engine of FIG. 1, illustrating, in longitudinal axial section, the nacelle of the engine.

Referring now to the drawings, and particularly to FIGS. 1 and 3, there is illustrated a gas turbine engine, generally designated 10, to which a variable contour annular air inlet 12 of the present invention is applied. The engine 10 has a longitudinal center line or axis A and includes a core engine 14 which produces thrust to propel the aircraft and a fan assembly 16 driven by the core engine 14 to produce additional thrust. Housing the core engine 14 and fan assembly 16 is an annular nacelle 18 which extends concentrically about the engine axis A and includes an inner, or core, cowl 20 surrounding the core engine 14 and an outer, or fan, cowl 22 surrounding the fan assembly 16. The outer cowl 22 of the nacelle 18 also surrounds and is spaced from a forward portion of the inner cowl 20 thereof for defining an annular fan discharge nozzle 24 as best seen in FIG. 3. The variable contour annular inlet 12 is provided at a forward portion 22A of the outer cowl 22 of the nacelle 18 for receiving the engine airflow portion 26 of a freestream airflow 28.

During aircraft operation, the engine airflow portion 26 is accelerated by the fan assembly 16 and is discharged from the fan nozzle 24 over the inner cowl 20 of the nacelle 18 for generating thrust. The freestream air flow 28 flows downstream over the outer cowl 22 of the nacelle 18, interacts with or scrubs the outer cowl 22, and produces aerodynamic drag, a significant portion of which is frictional and pressure drag acting in a direction opposite to that of the moving aircraft.

Variable Contour Annular Inlet of Nacelle

Referring to FIGS. 1-6, the variable contour annular air inlet 12 of the present invention is provided on the forward portion 22A of the annular outer fan cowl 22 of the engine nacelle 18. The rearward portion 22B of the outer cowl 22 of the nacelle 18 is an annular body of fixed configuration composed of an annular interior fan case 30 and an annular exterior surface structure 32. The outer cowl 22 contains an annular bulkhead 34 at the juncture of the forward and rearward portions 22A, 22B thereof. In FIG. 3, a conventional accessory drive module 36, composed of an accessory gearbox 38 drivingly coupled to a transfer gearbox 40, is shown positioned within the annular body 22B below the fan assembly 16 and between the interior fan case 30 and exterior surface structure 32.

As will be described hereinafter, the contour of the annular inlet 12 can be changed in flight between an aerodynamically blunt configuration, as seen in FIG. 4, and an aerodynamically sharp configuration, as seen in FIG. 6, for accommodating the different conditions of takeoff and cruise modes of operation of an aircraft employing the engine 10. In such manner, the contour of the annular inlet 12 can be changed so as to allow optimum performance at both cruise conditions and takeoff and landing conditions.

In its basic components, the variable contour annular air inlet 12 includes annular outer and inner structures 42, 44, an annular member 46, and actuation means in the form of a plurality of actuating mechanisms 48. The annular outer and inner structures 42, 44 of the annular inlet 12 are spaced apart radially with respect to the central axis A and respectively define exterior and interior surfaces on the forward portion 22A of the outer nacelle cowl 22. The annular inner structure 44 has a relatively rigid honeycomb construction of fixed diameter and is rigidly connected at its rear end to the front end of the interior fan case 30. In contrast thereto, the annular outer structure 42 at its annular forward end portion is expandable and contractible in diameter and at its annular rear end is hingedly connected by an annular hinge arrangement 50 to the front end of the exterior surface structure 32 and the outer edge of the annular bulkhead 34.

More particularly, referring FIGS. 1 and 2, the annular outer structure 42 includes a plurality of longitudinal flaps or segments 52 disposed in a side-by-side circumferential arrangement about the central axis A. The longitudinal segments 52 have generally trapezoidal shapes such that triangular-shaped gaps 54 remain between them, the widest dimension of the gaps being between the front ends of the longitudinal segments 52. The longitudinal segments 52 are hinged mounted at their rear ends by the hinge arrangement 50 to the exterior surface structure 32 of rearward annular body 22B for pivotal movement radially toward and away from the central axis A. The hinge arrangement 50 includes a plurality of forward hinge segments 56 circumferentially arranged end-to-end and rigidly attached to the interior side of the rear ends of the longitudinal segments 52 and a rear annular hinge part 58 rigidly attached to the front end of the exterior surface structure 32 and the outer edge of the annular bulkhead 34. The forward hinge segments 56 are pivotal connected at 60 to the rear hinge part 58. Concurrent pivotal movement of the longitudinal segments 52 produces contraction and expansion of the annular outer structure 42 between the reduced and enlarged diameters at the forward end portions thereof.

The annular member 46 of the annular inlet 12 is preferably in the form of a hollow annular ring or tube. The tubular annular member 46 is disposed between the annular outer and inner structures 42, 44 and is coupled to the annular outer structure 42 for sliding movement along the interiors of the annular outer and inner structures 42, 44. The tubular annular member 46 has an annular forward surface portion 46A of a generally curved shape and an annular rear and top surface portion 46B of a generally flat angled shape. Preferably, the curved shape of the forward surface portion 46A is elliptical so as to form a blunt nose when in the forward position of FIGS. 1, 3 and 4.

Referring to FIGS. 1, 3 and 4–7, the annular tubular member 46 is coupled to the interior of the annular outer structure 42 by a coupling arrangement 62 which includes an annular flange 64 on the annular member 46, a plurality of longitudinal guide tracks 66 on the longitudinal segments 52, and a plurality of guide elements 68. The annular flange 64 is attached at the upper rear side of the annular tubular member 46. The guide tracks 66 extend longitudinally along and are attached on the interiors of the longitudinal segments 52 of the annular outer structure 42. Each track 66 defines a longitudinal guide channel 70 with a bottom slot 72. Each of the guide elements 68 includes a slider portion 68A contained within one of the guide channels 70 and an inwardly projecting link portion 68B which is received between one of a plurality of pairs of outwardly projecting tabs 74 on the annular flange 64 and pivotally connected thereto by a pivot pin 76.

Referring to FIGS. 1 and 3–6, each actuating mechanism 48 of the variable contour annular inlet 12 is coupled between the bulkhead 34 within the outer cowl 22 of the nacelle 18 and the annular flange 64 on the annular member 46. The actuating mechanisms 48 are operable for moving the annular member 46 between forward and rearward positions seen respectively in FIGS. 4 and 6. The actuating mechanisms 48 are circumferentially spaced from one another about the central axis A.

More particularly, each actuating mechanism 48 includes an extendable and retractable actuator 78 coupled to and extending between the bulkhead 34 and the flange 64 on the annular member 46, and a power means 80 drivingly coupled to the actuator 78. In an exemplary embodiment, the actuator 78 is an extendable and retractable screw jack 78 having a forward externally-threaded shaft 78A and a rearward internally-threaded sleeve 78B which threadably mates with the forward shaft 78A. The forward shaft 78A of the screw jack 78 is pivotally connected at its forward end at 82 to the tabs 74 on the annular flange 64 and the rearward sleeve 78B of the screw jack 78 is rotatably supported at its rear end by a bearing trunnion mount 84 attached to the bulkhead 34. The power means 80 is a motor, either electrically, hydraulically or air powered, which is also supported by the mount 84 and is coupled to the rearward sleeve 78B of the screw jack 78. The motor 80 is selectively operable to rotate the rearward sleeve 78B of the screw jack 78 in one or the other opposite directions to correspondingly extend or retract the forward shaft 78A from or into the rearward sleeve 78B and thereby correspondingly move the annular tubular member 46 between its forward and rearward positions.

Thus, through concurrent and identical operation of the actuating mechanisms 48, the annular tubular member 46 is moved through the intermediate position seen in FIG. 5 and between the terminal forward and rearward positions seen respectively in FIGS. 4 and 6. At the forward position, the annular member 46 is located between and in engagement with forward ends of the annular outer and inner structures 42, 44, with the annular outer structure 42 expanded to an enlarged diameter. In such positional relationship, the annular member 46, together with the forward end portions of the outer and inner structures 42, 44, form an annular lip 86 on the inlet 12, as seen in FIGS. 1, 3 and 4, having an aerodynamically blunt exterior contour adapted to reduce drag during takeoff and landing operation of the aircraft. At the rearward position, the annular member 46 is spaced rearwardly from the forward ends of the annular outer and inner structures 42, 44, with the annular outer structure 42 contracted to a reduced diameter. In such positional relationship, the annular outer and inner structures 42, 44 at the forward end portions thereof form the inlet lip 86 having an aerodynamically sharp exterior contour adapted to reduce drag during cruise operation of the aircraft.

Parenthetically, it should be mentioned that the annular outer structure 42 at its forward end has an annular seal 88 fixed thereon, such as of foam rubber or silicone material. Further, the interior of the annular inner structure 44 along which the annular member 46 slides in traversing between its forward and rearward positions has a constant fixed diameter as does the annular member itself.

Figure 8:
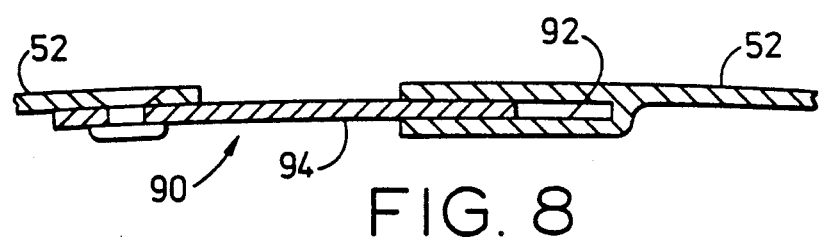
FIG. 8 is an enlarged fragmentary cross-sectional view of one embodiment of a nacelle seal employed in the variable contour annular inlet as taken along line 8—8 of FIG. 1.
Figure 9:
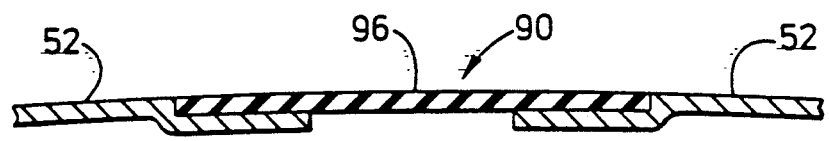
FIG. 9 is an enlarged fragmentary cross-sectional view of another embodiment of the nacelle seal.
Figure 10:
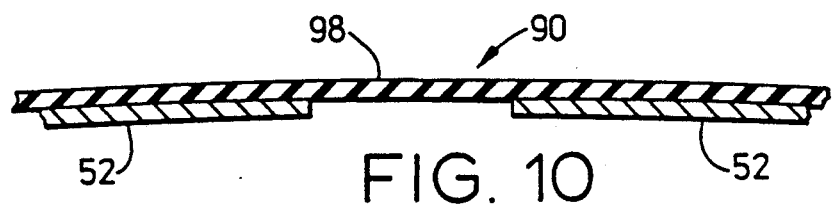
FIG. 10 is an enlarged fragmentary cross-sectional view of still another embodiment of the nacelle seal.

The annular outer structure 42 of the air inlet 12 further includes means 90 for sealable covering the gaps 54 existing between the longitudinal segments 52. Several different embodiments of the covering means 90 are seen in FIGS. 8–10. In FIG. 8, the covering means 90 includes a plurality of grooves 92 (only one being shown) each defined along one of a pair of opposite longitudinal edges of each of the longitudinal segments 52, and a plurality of strips 94 (only one being shown) of rigid material each connected to the other of the pair of opposite longitudinal edges of each of the longitudinal segments 52. The strip 94 is interfitted with the groove 92 for movement within the groove. In FIG. 9, the covering means 90 includes a plurality of strips 96 of stretchable elastic material extending between and along the longitudinal segments 52 and connected to opposite longitudinal edges of the longitudinal segments. In FIG. 10, the covering means 90 is an annular boot 98 of stretchable elastic material extending about and encompassing the annular outer structure 42.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. In an annular nacelle for a turbine aircraft engine having an annular body with a central axis, a variable contour annular air inlet, comprising:
   (a) a pair of annular outer and inner surface-defining structures extending axially forwardly from said annular body and being spaced radially from one another with respect to said central axis, said annular outer structure having an annular forward end portion expandable and contractible in diameter;
   (b) an annular member being disposed between said annular outer and inner structures and coupled to said annular outer structure for sliding movement along the interiors of said annular outer and inner structures and said central axis; and
   (c) means coupled between said annular body and annular member and being operable for moving said annular member between a forward position where said annular member is located between forward ends of said annular outer and inner structures with said forward end portion of said annular outer structure expanded to an enlarged diameter such that said annular member, together with said annular outer and inner structures, form an inlet lip having an aerodynamically blunt exterior contour adapted to reduce drag during takeoff and landing operation of the aircraft, and a rearward position where said annular member is spaced rearwardly from forward ends of said annular outer and inner structures with said annular outer structure contracted to a reduced diameter permitting said annular outer and inner structures at said forward end portions thereof to form an inlet lip having an aerodynamically sharp exterior contour adapted to reduce drag during cruise operation of the aircraft.

2. The inlet as recited in claim 1, wherein said annular outer structure includes a plurality of longitudinal segments being disposed side-by-side circumferentially about said central axis and hinged mounted at rear ends thereof to said annular body for pivotal movement radially toward and away from said central axis so as to correspondingly cause contraction and expansion of said annular outer structure between said reduced and enlarged diameters at said forward end portion thereof.

3. The inlet as recited in claim 2, wherein said longitudinal segments are trapezoidal shaped.

4. The inlet as recited in claim 2, further comprising:
   an arrangement for coupling said annular member to said longitudinal segments and said operable means, said arrangement including a plurality of longitudinal guide tracks on said longitudinal segments, and a plurality of guide elements slidable along said tracks and pivotally connected to said operable means and said annular member.

5. The inlet as recited in claim 4, wherein each of said tracks extends longitudinally along and is attached on the interior of one of said longitudinal segments, each track defining a longitudinal guide channel with a bottom slot.

6. The inlet as recited in claim 5, wherein each of said guide elements includes a slider portion contained within one of said guide channels and an inwardly projecting link portion extending through said slot and pivotally connected to said annular member and said operable means.

7. The inlet as recited in claim 2, wherein said annular outer structure further includes means for sealable covering any gaps existing between said longitudinal segments.

8. The inlet as recited in claim 7, wherein said covering means includes a plurality of strips of stretchable elastic material extending between and along said longitudinal segments and connected to opposite longitudinal edges of said longitudinal segments.

9. The inlet as recited in claim 7, wherein said covering means includes:
   a plurality of grooves each defined along one of a pair of opposite longitudinal edges of each of said longitudinal segments; and
   a plurality of strips of rigid material each connected to the other of said pair of opposite longitudinal edges of each of said longitudinal segments and interfitted with said groove defined along said one edge thereof for movement within said groove.

10. The inlet as recited in claim 7, wherein said covering means is an annular boot of stretchable elastic material extending about and encompassing said annular outer structure.

11. The inlet as recited in claim 1, wherein said operable means includes a plurality of actuating mechanisms spaced circumferentially from one another about said central axis.

12. The inlet as recited in claim 11, wherein each of said actuating mechanisms includes an extendable and retractable actuator coupled to and extending between said nacelle body and said annular member.

13. The inlet as recited in claim 12, wherein each of said actuating mechanisms includes a power means drivingly coupled to said extendable and retractable actuator.

14. The inlet as recited in claim 13, wherein:
   each of said actuators is an extendable and retractable screw jack; and
   each of said power means is a motor drivingly coupled to said screw jack.

15. The inlet as recited in claim 1, wherein said annular member is in the form of a hollow annular tube.

16. The inlet as recited in claim 1, wherein said annular member has curved annular forward surface portion.

17. The inlet as recited in claim 16, wherein said curved annular forward surface portion of said annular member has a generally elliptical shape.

18. In an annular nacelle for a turbine aircraft engine having an annular body with a central axis, a variable contour annular air inlet, comprising:
   (a) a pair of annular outer and inner surface-defining structures extending axially forwardly from said annular body and being spaced radially from one another with respect to said central axis, said annular outer structure having an annular forward end portion capable of expansion and contraction in diameter, said annular inner structure having an annular forward end portion of a fixed diameter;
   (b) an annular member having a curved annular forward surface portion and a fixed diameter, said annular member being disposed between said annular outer and inner structures and coupled to said annular outer structure for sliding movement along the interiors of said annular outer and inner structures and said central axis; and
   (c) means coupled between said annular body and annular member and being operable for moving said annular member between a forward position at which said annular member is located between forward ends of said annular outer and inner structures with said forward end portion of said annular outer structure expanded to an enlarged diameter such that said annular member, together with said annular outer and inner structures, form an inlet lip having an aerodynamically blunt exterior contour adapted to reduce drag during takeoff and landing operation of the aircraft, and a rearward position at which said annular member is spaced rearwardly from forward ends of said annular outer and inner structures with said annular outer structure contracted to a reduced diameter permitting said annular outer and inner structures at said forward end portions thereof to form an inlet lip having an aerodynamically sharp exterior contour adapted to reduce drag during cruise operation of the aircraft;

(d) said annular outer structure including a plurality of trapezoidally-shaped, circumferentially side-by-side disposed longitudinal segments hinged mounted at rear ends thereof to said annular body for pivotal movement radially toward and away from said central axis so as to correspondingly cause contraction and expansion of said annular outer structure between said reduced and enlarged diameters at said forward end portion thereof;

(e) said annular outer structure further including means for sealable covering any gaps existing between said longitudinal segments.

19. The inlet as recited in claim 18, further comprising:

an arrangement for coupling said annular member to said longitudinal segments and said actuation means, said arrangement including a plurality of longitudinal guide tracks on said longitudinal segments, and a plurality of guide elements slidable along said tracks and pivotally connected to said operable means and said annular member.

20. The inlet as recited in claim 19, wherein each of said tracks extends longitudinally along and is attached on the interior of one of said longitudinal segments, each track defining a longitudinal guide channel with a bottom slot.

21. The inlet as recited in claim 20, wherein each of said guide elements includes a slider portion contained within one of said guide channels and an inwardly projecting link portion extending through said slot and pivotally connected to said annular member and said operable means.

22. The inlet as recited in claim 18, wherein said covering means includes a plurality of strips of stretchable elastic material extending between and along said longitudinal segments and connected to opposite longitudinal edges of said longitudinal segments.

23. The inlet as recited in claim 18, wherein said covering means includes:

a plurality of grooves each defined along one of a pair of opposite longitudinal edges of each of said longitudinal segments; and a plurality of strips of rigid material each connected to the other of said pair of opposite longitudinal edges of each of said longitudinal segments and interfitted with said groove defined along said one edge thereof for movement within said groove.

24. The inlet as recited in claim 18, wherein said covering means is an annular boot of stretchable elastic material extending about and encompassing said annular outer structure.

25. The inlet as recited in claim 18, wherein said operable means includes a plurality of actuating mechanisms spaced circumferentially from one another about said central axis.

26. The inlet as recited in claim 25, wherein each of said actuating mechanisms includes an extendable and retractable actuator coupled to and extending between said annular body and said annular member.

27. The inlet as recited in claim 26, wherein each of said actuating mechanisms includes a power means drivingly coupled to said extendable and retractable actuator.

28. The inlet as recited in claim 27, wherein:

each of said actuators is an extendable and retractable screw jack; and each of said power means is a motor drivingly coupled to said screw jack.

29. The inlet as recited in claim 18, wherein said annular member is in the form of a hollow annular tube.

30. The inlet as recited in claim 18, wherein said curved annular forward surface portion of said annular member has a generally elliptical shape.

* * * * *